US012025194B2

(12) United States Patent
Lu et al.

(10) Patent No.: US 12,025,194 B2
(45) Date of Patent: *Jul. 2, 2024

(54) BRAKE

(71) Applicant: ALTRA INDUSTRIAL MOTION (SHENZHEN) CO., LTD., Shenzhen (CN)

(72) Inventors: Cha Lu, Shenzhen (CN); Kongjian Wu, Shenzhen (CN); Atkesone Bernard, Shenzhen (CN)

(73) Assignee: Altra Industrial Motion (Shenzhen) Co., Ltd., Shenzhen (CN)

( * ) Notice: Subject to any disclaimer, the term of this patent is extended or adjusted under 35 U.S.C. 154(b) by 94 days.

This patent is subject to a terminal disclaimer.

(21) Appl. No.: 17/889,082

(22) Filed: Aug. 16, 2022

(65) Prior Publication Data

US 2023/0089075 A1    Mar. 23, 2023

Related U.S. Application Data

(63) Continuation of application No. PCT/CN2022/076704, filed on Feb. 17, 2022.

(30) Foreign Application Priority Data

Sep. 18, 2021  (CN) .......................... 202111100757.4

(51) Int. Cl.
*F16D 55/22*    (2006.01)
*F16D 65/00*    (2006.01)
(Continued)

(52) U.S. Cl.
CPC .......... *F16D 55/22* (2013.01); *F16D 65/0006* (2013.01); *F16D 65/0031* (2013.01); *F16D 65/186* (2013.01); *F16D 2121/22* (2013.01)

(58) Field of Classification Search
CPC ...... F16D 65/18; F16D 59/02; F16D 2121/22; F16D 55/36; F16D 55/226; F16D 55/227;
(Continued)

(56) References Cited

U.S. PATENT DOCUMENTS 3,326,343 A * 6/1967 Stuckens ............... F16D 27/112
192/84.96
4,476,965 A * 10/1984 Brown, Jr. ............. F16D 59/02
188/72.3
(Continued)

FOREIGN PATENT DOCUMENTS

CN    103791003 A    5/2014
CN    106989122 A    7/2017
(Continued)

OTHER PUBLICATIONS

CN 207550189 U (Year: 2018).*
(Continued)

*Primary Examiner* — Robert A. Siconolfi
*Assistant Examiner* — Mahbubur Rashid
(74) *Attorney, Agent, or Firm* — AP3 Law Firm PLLC

(57) ABSTRACT

The disclosure provides a brake including a magnetic yoke iron core, a movable plate, a friction disk, a coil, an armature and an elastic part; a first mounting space penetrates through a center position of the magnetic yoke iron core in the axial direction; an opening of a second mounting space faces a second shaft end; the movable plate is located in the first mounting space and close to a first shaft end; the friction disk is arranged in the first mounting space and located at a side of the movable plate close to the second shaft end; the coil is arranged in the second mounting groove; the armature is located at the second shaft end, and the armature is connected with the movable plate through a connector; and
(Continued)

the elastic part has pre-tightening force that enables the armature to be far away from the magnetic yoke iron core.

14 Claims, 15 Drawing Sheets

(51) Int. Cl.
  *F16D 65/18* (2006.01)
  *F16D 121/22* (2012.01)
(58) Field of Classification Search
  CPC .. F16D 65/186; F16D 65/097; F16D 25/0638; F16D 55/22; F16D 55/2262; F16D 2121/20; F16D 55/2265; F16D 65/14; F16D 2129/08; F16D 2121/16; F16D 2065/386; F16D 2055/005; F16D 13/52; F16D 2055/0033; F16D 2065/1392; F16D 13/69; F16D 2065/1348; F16D 2065/1316; F16D 2125/582; F16D 67/06; F16D 57/002; F16D 2065/1312; F16D 2200/0056; F16D 2129/06; F16D 2129/10; F16D 23/14; F16D 27/115; F16D 43/216; F16D 55/04; F16D 63/002; F16D 65/0006; F16D 65/0031
  See application file for complete search history.

(56) References Cited

U.S. PATENT DOCUMENTS

| | | | | |
|---|---|---|---|---|
| 4,938,321 A * | 7/1990 | Kelley | ................ | F16D 65/853 188/71.6 |
| 5,185,542 A * | 2/1993 | Lazorchak | ............. | F16D 59/02 310/105 |
| 5,685,398 A * | 11/1997 | Marshall | ................ | F16D 59/02 188/196 R |
| 5,915,507 A * | 6/1999 | Maurice | ................ | F16D 59/02 188/72.9 |
| 6,459,182 B1 * | 10/2002 | Pfann | ................... | H02K 7/1025 188/161 |
| 6,675,940 B2 * | 1/2004 | Maurice | ................ | B60T 13/04 188/72.9 |
| 10,612,610 B2 * | 4/2020 | Silvestrini | ............... | F16D 55/08 |
| 10,683,857 B2 * | 6/2020 | Escher | ................. | F04B 17/042 |
| 2006/0169550 A1 * | 8/2006 | Albrecht | ................ | F16D 55/02 188/73.1 |
| 2008/0136279 A1 * | 6/2008 | Berndt | .................... | F16D 55/02 310/103 |
| 2019/0316642 A1 * | 10/2019 | Silvestrini | ............... | F16D 55/22 |

FOREIGN PATENT DOCUMENTS

| | | |
|---|---|---|
| CN | 107061564 A | 8/2017 |
| CN | 109058331 A | 12/2018 |
| CN | 209340390 U | 9/2019 |
| CN | 110375020 A | 10/2019 |
| CN | 110873135 A | 3/2020 |
| DE | 19838658 C1 | 3/2000 |
| JP | 08284979 A | 11/1996 |
| JP | 2003074594 A | 3/2003 |
| KR | 101729293 B1 | 4/2017 |
| WO | 2006033149 A1 | 3/2006 |

OTHER PUBLICATIONS

CN 207018398 U (Year: 2018).*
AT 508579 A1 (Year: 2011).*
DE 102016119027 A1 (Year: 2018).*
DE 521091 C (Year: 1931).*

* cited by examiner

BRAKE

CROSS-REFERENCE TO RELATED APPLICATIONS

This application is a continuation of International Application No. PCT/CN2022/076704, filed on Feb. 17, 2022, which claims priority to Chinese Patent Application No. 202111100757.4, filed on Sep. 18, 2021. The disclosures of the aforementioned applications are hereby incorporated by reference in their entireties.

TECHNICAL FIELD

The present application relates to the technical field of brake, in particular to an electromagnetic brake.

BACKGROUND

Electromagnetic brake is a widely used device. The traditional electromagnetic brake adopts the stacking assembly method, that is, the main components of the electromagnetic brake, including a magnetic yoke, an armature, a friction disk and a tail plate and so on, are stacked along the axial direction of the braked shaft. This assembly method leads to the large axial thickness of the traditional electromagnetic brake. However, with the emergence of some adverse factors (for example, the installation space becomes smaller), users have higher and higher expectations for thinning the thickness of the electromagnetic brake. Especially in some special applications, the use environment requires that the thickness of the electromagnetic brake must be very small, while the traditional electromagnetic brake cannot be used because of its large thickness.

FIG. 15 is a structural diagram of an electromagnetic brake in the prior art. The brake includes a magnetic yoke 91, an armature 94, a friction disk 96 and a tail plate 95, which are stacked in turn along the axis X direction of the braked shaft. The working principle of the electromagnetic brake shown in FIG. 15 is as follows:

The braked shaft is connected with the friction disk 96 through a shaft sleeve 97, and the friction disk 96 rotates coaxially with the braked shaft. When the friction disk 96 is clamped by the armature 94 and the tail plate 95, the friction disk 96 rubs against the armature 94 and the tail plate 95 to generate a braking force. Under the action of the braking force, the braked shaft stops rotating together with the friction disk 96 to realize braking. When the friction disk 96 is released (that is, the friction disk 96 is not clamped by the armature 94 and the tail plate 95), the friction disk 96 will not rub against the armature 94 and the tail plate 95, and no braking force will be generated. When there is no braking force, the braked shaft can rotate freely.

The tail plate 95 is connected to the magnetic yoke 91 through a threaded connector 98 and a sleeve 99 and remains relatively fixed. The armature 94 can move axially, thereby changing the distance M between the tail plate 95 and the armature 94. When the distance M increases, the friction disk 96 is released and the braked shaft can rotate freely. When the distance M decreases, the friction disk 96 is clamped to realize braking. The armature 94 moves axially through a coil 92 and a spring 93. When the coil 92 is not energized, the spring 93 pushes the armature 94 close to the tail plate 95, the distance M decreases, and the friction disk 96 is clamped. When the coil 92 is energized, a magnetic force is generated. Under the attraction of the magnetic force, the armature 94 overcomes the elastic force of the spring 93, approaches the magnetic yoke 91 and away from the tail plate 95, the distance M increases, and the friction disk 96 is released.

It can be clearly seen from FIG. 15 that the magnetic yoke 91, the armature 94, the friction disk 96 and the tail plate 95 are stacked in turn in the axis X direction. The thickness of the magnetic yoke 91, the armature 94, the friction disk 96 and the tail plate 95 form part of the overall thickness of the electromagnetic brake, and the overall thickness of the electromagnetic brake is large.

In order to reduce the overall thickness of the electromagnetic brake, the traditional practice is to reduce the thickness of the magnetic yoke 91, the armature 94, the friction disk 96 and the tail plate 95 as much as possible by using better materials and more refined processing technology. Although the overall thickness of the electromagnetic brake can be reduced and the problem of excessive thickness of the electromagnetic brake solved to a certain extent, but the following new problems will be caused:

(1) After the magnetic yoke 91 becomes thinner, the space containing the coil 92 becomes smaller, resulting in a reduction in the volume of the coil 92. After the volume of coil 92 decreases, the magnetic field decreases and the heating power of coil 92 increases.

(2) After the friction pair parts (i.e., the armature 94, the friction disk 96 and the tail plate 95) become thinner (the diameter thickness ratio increases), at least the following four problems will occur. Firstly, the rigidity of the parts is weakened, and the parts are prone to creep or stress deformation. Secondly, the materials of parts become less, the heat capacity decreases, the temperature of parts rises rapidly in the process of friction, and the braking torque attenuation is easy to occur. Rapid temperature rise of parts will also lead to thermal stress and deformation. In serious cases, the parts may be completely damaged and the brake may be scrapped. Thirdly, the extremely thin friction pair parts will amplify the noise (similar to the function of horn diaphragm) or make the noise sharper during friction. Fourthly, after the thickness of friction disk 96 is reduced, the structural strength is insufficient and the processing difficulty increases. The perpendicularity between the middle hole of the friction disk 96 and the friction surface becomes worse. Moreover, the fitting length between the middle hole of the friction disk 96 and the braked shaft or shaft sleeve 97 becomes smaller. The friction disk 96 is prone to oscillate during rotation, making abnormal noise and increasing the drag torque. When rotating at high speed, the friction surface of the friction disk 96 is easy to be locally ablated, so as to reduce the friction torque and affect the braking effect.

SUMMARY

These and other problems are generally solved or circumvented, and technical advantages are generally achieved, by embodiments of the present application which provide a brake.

Technical Problems

The present application provides a brake, which aims to solve the problem of large thickness of the brake and reduce the thickness of the brake without causing new problems.

Technical Solutions

In order to solve the above problems, the present application provides a brake, which includes a magnetic yoke iron core, a movable plate, a friction disk, a coil, an armature and an elastic part. The magnetic yoke iron core is a housing structure. The movable plate, the friction disk, the coil and the elastic part are all located inside the magnetic yoke iron core. In other words, the thickness of parts such as the movable plate and the friction disk does not increase the overall thickness of the brake. The overall thickness of the brake is only related to the thickness of the magnetic yoke iron core and the thickness of the armature (there is a small air gap between the magnetic yoke iron core and the armature, which can be ignored when considering the overall thickness of the brake).

The interior of the magnetic yoke iron core is provided with a first mounting space and a second mounting space. The first mounting space is located in the center of the magnetic yoke iron core and passes through the magnetic yoke iron core along the axial direction (the axial direction of the magnetic yoke iron core is consistent with the axial direction of the braked shaft). The second mounting space is concentric with the first mounting space, and the second mounting space is arranged around the first mounting space, that is, the first mounting space and the second mounting space are distributed concentrically from inside to outside. The second mounting space has an opening towards the second shaft end of the magnetic yoke iron core. The armature is located at the second shaft end of the magnetic yoke iron core and faces the opening of the second mounting space. The coil is located in the second mounting space. The magnetic field generated when the coil is energized can be conducted in the magnetic circuit formed by the magnetic yoke iron core and the armature, and magnetize the magnetic yoke iron core and the armature to attract each other. At this time, the armature can be close to the magnetic yoke iron core along the axial direction.

The armature can also be away from the magnetic yoke iron core along the axial direction. The power taken away from the magnetic yoke iron core comes from the elastic part. The main body of the elastic part (such as spring) is located inside the magnetic yoke iron core (because the elastic part need to contact the armature, part of the elastic part is outside the magnetic yoke iron core, but this part is very small). The elastic part has an elastic force that can push the armature and keep the armature away from the magnetic yoke iron core.

The friction disk and the movable plate are located inside the first mounting space. The movable plate is connected with the armature through the connector and can move axially driven by the armature, so as to be close to and compact the friction disk or away from the friction disk. When the movable plate compacts the friction disk, braking force is generated, and the rotation of the friction disk is blocked. The friction disk is installed on the braked shaft and can transmit the braking force to the braked shaft to realize braking. On the contrary, when the movable plate is far away from the friction disk, the rotation blocked state of the friction disk is released, and the braked shaft can rotate freely.

Advantageous Effects of the Disclosure

Compared with the prior art, the brake provided by the present application, where the magnetic yoke iron core has a first mounting space capable of accommodating parts such as the friction disk and the movable plate. After the brake is assembled, the friction disk and the movable plate are located in the first mounting space without increasing the overall thickness of the brake, so as to solve the problem of large thickness of the existing brake and realize the purpose of reducing the thickness of the brake.

The above mentioned that although the traditional method can achieve the purpose of reducing the thickness of the brake to a certain extent by reducing the thickness of each part, but it causes many new problems. The brake provided in the present application provides a new solution, which can not only reduce the thickness of the brake, but also cause no new problems. There is description in more detail below. The brake provided in the present application has great advantages over the traditional brake.

BRIEF DESCRIPTION OF THE DRAWINGS

In order to more clearly illustrate the technical solutions in the embodiments of the present application, the drawings used in the embodiments or the prior art description will be briefly described below, and it is obvious that the drawings in the following description are only some embodiments of the present application, and that other drawings can be obtained from these drawings without involving any inventive effort for a person skilled in the art.

Figure 1:
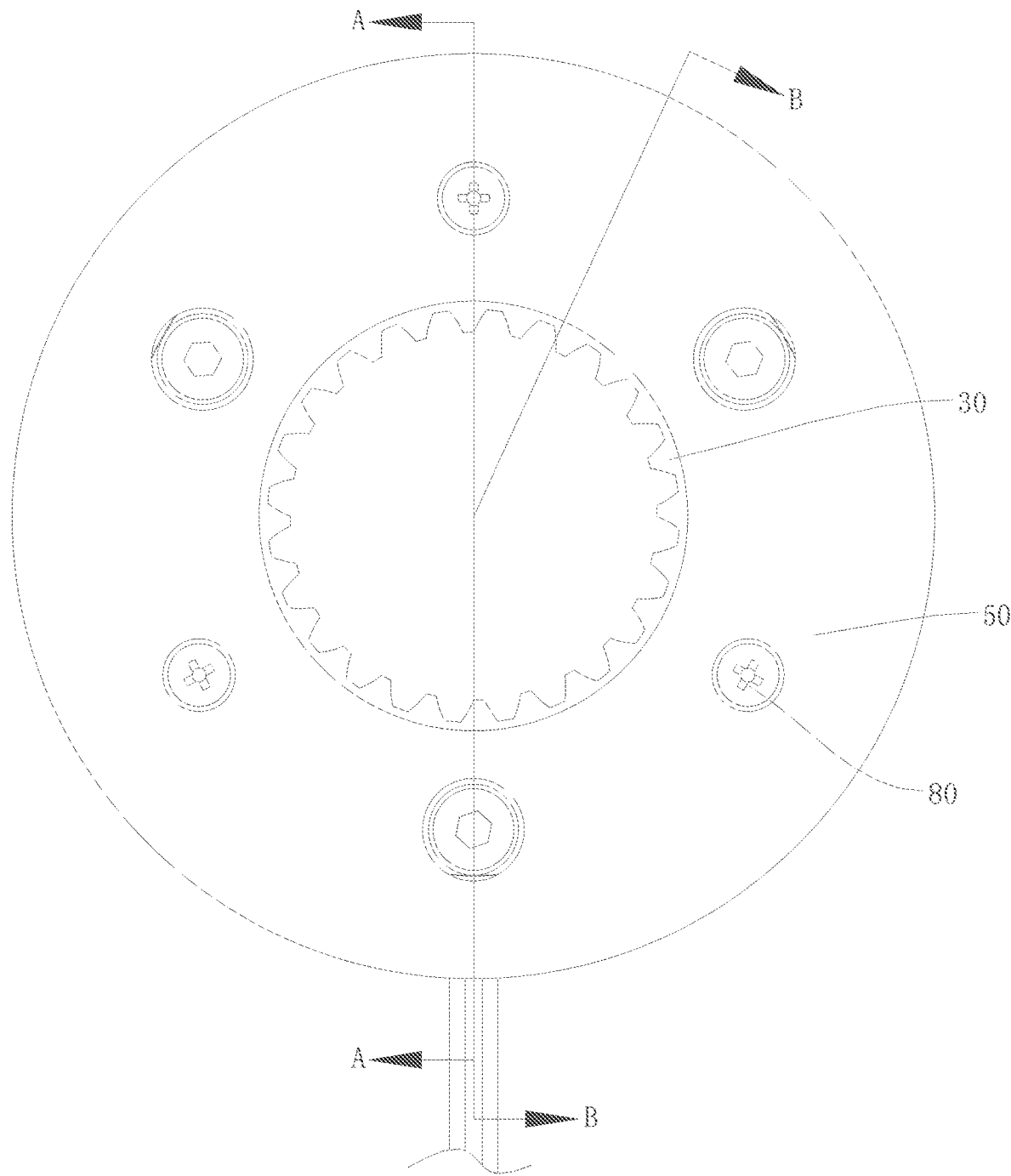
FIG. 1 is a schematic front structural diagram of the brake provided by one embodiment of the present application.

10—magnetic yoke iron core; 11—first mounting space; 12—second mounting space; 13—extending portion; 14—connecting hole; 15—mounting hole; 16—blind hole; 17—positioning slot; 18—mounting area; 20—movable plate; 21—locating block; 30—friction disk; 31—friction monomer; 311—first accommodating groove; 312—chute; 313—second accommodating groove; 314—boss; 32—elastic component; 321—first tension spring; 322—second tension spring; 323—guide post; 324—fixed frame; 33—central space; 40—coil; 50—armature; 60—elastic part; 70—shaft sleeve; 80—connector; 81—connecting part; 82—guide pole.

DETAILED DESCRIPTION OF ILLUSTRATIVE EMBODIMENTS

In order to make the technical problems, technical solutions and beneficial effects clearer, the application is further described in detail below in combination with the attached drawings and embodiments. It should be understood that the specific embodiments described herein are only used to explain the application and are not used to limit the application.

The First Embodiment

With reference to FIG. 1- FIG. 14, the brake provided by embodiments of this application is now described. The brake includes a magnetic yoke iron core 10, a movable plate 20, a friction disk 30, a coil 40 (excitation coil), an armature 50 and an elastic part 60. The magnetic yoke iron core 10 distributes a first mounting space 11 (first space) and a second mounting space 12 (second space) sequentially and concentrically from inside to outside of the magnetic yoke iron core 10; the first mounting space 11 penetrates through a center position of the magnetic yoke iron core 10 in an axial direction of the magnetic yoke iron core, and an opening of the second mounting space 12 faces a second shaft end of the magnetic yoke iron core 10. The movable plate 20 is located in the first mounting space 11 and close to a first shaft end of the magnetic yoke iron core 10; the first shaft end is an opposite end of the second shaft end. The friction disk 30 is arranged in the first mounting space 11 and located at the side of the movable plate 20 close to the second shaft end. The coil 40 is arranged in the second mounting space 12. The armature 50 is located at the second shaft end of the magnetic yoke iron core 10; the armature 50 is connected with the movable plate 20 through at least one connector 80; the at least one connector 80 passes through the magnetic yoke iron core 10 and is slidably matched with the magnetic yoke iron core 10; and the armature 50 is configured to drive the movable plate 20 to move along the axial direction of the magnetic yoke iron core 10. The elastic part 60 is arranged between the armature 50 and the magnetic yoke iron core 10, and the elastic part 60 has a pre-tightening force that enables the armature 50 to be far away from the magnetic yoke iron core 10. The number of the elastic part 60 may be one or more.

It should be noted that the axial direction of the magnetic yoke iron core 10 is the thickness direction of the magnetic yoke iron core 10. After the magnetic yoke iron core 10 forms the brake, the axis of the braked shaft penetrates through the center of the magnetic yoke iron core 10 along the thickness direction of the magnetic yoke iron core 10. That is, the center line which penetrates through the magnetic yoke iron core 10 along the thickness direction coincides with the axis of the braked shaft. The first shaft end is the first side of the magnetic yoke iron core 10, and the second shaft end is the second side of the magnetic yoke iron core 10. The first side and the second side are different sides of the magnetic yoke iron core 10 distributed along its own thickness direction. The second mounting space 12 may also be referred to as a second mounting groove. The magnetic yoke iron core 10 may also be referred to as a yoke, a housing, a magnetic conducting housing, a conducting magnet, a shell, or the like. The magnetic yoke iron core 10 and the armature 50 themselves are not magnetic. Those skilled in the art can understand that when the coil 40 is energized, both the magnetic yoke iron core 10 and the armature 50 are magnetized to produce magnetism, and they attract each other. While when the coil 40 is not energized, the magnetism of the magnetic yoke iron core 10 and the armature 50 disappears.

The working principle of the brake provided in this embodiment is as follows. When the brake is in use, the coil 40 is connected to the external power supply. When energizing the coil 40, the magnetic yoke iron core 10 and the armature 50 generate magnetic force attracting each other under the excitation of the coil 40. The magnetic force attracts the armature 50, and the armature 50 moves close to the first shaft end, compresses the elastic part 60, and drives the movable plate 20 to move away from the second shaft end. During the movement of the movable plate 20 away from the second shaft end, the friction disk 30 is released, and the end surface of the movable plate 20 is no longer squeezed against the friction disk 30. At the same time, the friction disk 30 is no longer squeezed into the structure which clamps the friction disk 30 in cooperation with the movable plate 20 to complete the release process. At this time, the friction disk 30 is matched with the braked shaft or shaft sleeve 70 and rotates normally. When the power is cut off, the magnetic force on the magnetic yoke iron core 10 and the armature 50 disappears, and the elastic part 60 releases to push the armature 50. The armature 50 moves away from the first shaft end and drives the movable plate 20 to move towards the second shaft end. The end surface of the movable plate 20 is squeezed on the friction disk 30, while the other end surface of the friction disk 30 is squeezed on the structure which clamps the friction disk 30 in cooperation with the movable plate 20. Due to the friction resistance, the speed of the friction disk 30 gradually decreases until zero, completing the braking process.

Compared with the traditional brake, the brake provided by this embodiment has at least the following two major improvements.

Figure 15:
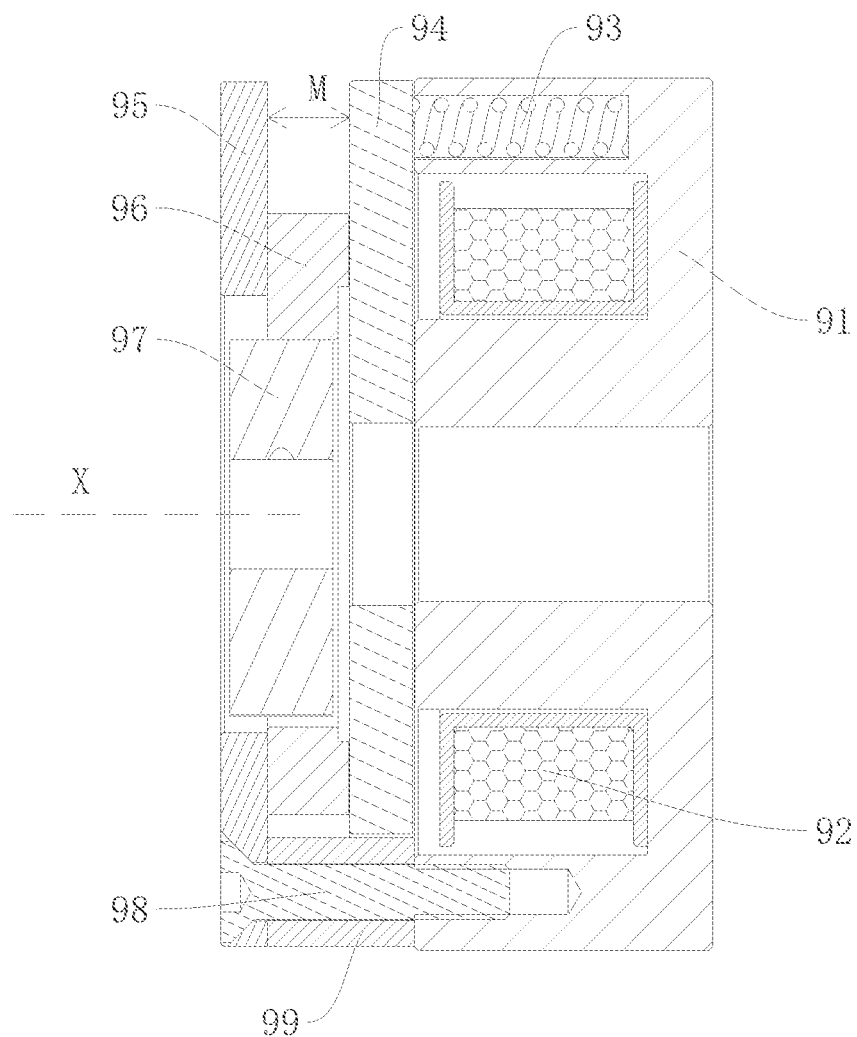
FIG. 15 is a schematic structural diagram of the stacked brake in the prior art.

A major improvement in the first aspect is the arrangement of the friction disk 30. In the traditional brake, as shown in FIG. 15, the friction disk 96 and the magnetic yoke 91 are stacked in the axial direction, and the friction disk 96 is located outside the magnetic yoke 91. In the brake provided by this embodiment, the friction disk 30 is located inside the magnetic yoke iron core 10, so the friction disk 30 does not increase the overall thickness of the brake.

A major improvement in the second aspect is the manner in which the friction disk 30 is clamped. In the traditional brake, as shown in FIG. 15, when braking, the friction disk 96 is clamped by the armature 94 and the tail plate 95. In the brake provided by this embodiment, the friction disk 30 is clamped by the movable plate 20 and a structure clamping the friction disk 30 in cooperation with the movable plate 20. Like the friction disk 30 and movable plate 20, the structure is also located inside the magnetic yoke iron core 10 without increasing the overall thickness of the brake. The movable plate 20 is connected with the armature 50 and moves axially driven by the armature 50 to clamp or loosen the friction disk 30. It should be noted that the above-mentioned clamping manner in which the friction disk 30 is clamped can ensure that the brake provided in this embodiment is a power-off braking, that is, when the coil 40 is powered off, the brake is in a braking state. Compared with power-on braking, those skilled in the art can understand that power-off braking is a safer way.

Compared with the traditional brake, the brake provided by this embodiment has many advantages.

Firstly, in the brake provided by this embodiment, the movable plate 20, the friction disk 30 and the coil 40 are all inside the magnetic yoke iron core 10. The thickness of individual parts such as movable plate 20, friction disk 30 and coil 40 will not increase the overall thickness of the brake, which greatly reduces the overall thickness of the brake. For example, the thickness of an existing brake is 14 mm. If the existing brake is modified according to the structure provided in this embodiment, the thickness of the existing brake can be easily reduced to 7 mm, and the thickness reduction effect is obvious. Regardless of the small air gap between the magnetic yoke iron core 10 and the armature 50, the overall thickness of the brake provided by this embodiment only depends on the sum of the thicknesses of the magnetic yoke iron core 10 and the armature 50.

Secondly, the thickness of the magnetic yoke iron core 10 does not have to be excessively reduced, so the space for accommodating the coil 40 can be guaranteed. The volume of the coil 40 does not have to be excessively compressed, which avoids the problems of weakening the magnetic field and increasing the heating power.

Thirdly, the thickness of the movable plate 20 and the friction disk 30 as friction pair pails does not increase the overall thickness of the brake. Therefore, the thickness of the movable plate 20 and the friction disk 30 can be guaranteed. The thickness of the movable plate 20 and the friction disk 30 need not be excessively reduced, which produces at least the following four advantages. Firstly, the rigidity of the parts is guaranteed, and the probability of creep and stress deformation of the parts is greatly reduced. Secondly, the materials of parts will not be reduced, and the heat capacity of parts can be guaranteed. During the friction process, the parts will not rise too fast, which greatly reduces the probability of adverse conditions such as braking force attenuation and thermal stress deformation. Thirdly, the thickness of the parts will not be too thin, and the parts will not amplify the noise or make the noise more sharp during friction. In fact, the brake provided in this embodiment has low noise, and is especially suitable for occasions with high speed and high requirements for silence. The friction disk 30 and the movable plate 20 are located in the first mounting space 11. When the brake works, the friction disk 30 and the movable plate 20 are surrounded by the magnetic yoke iron core 10 and the surrounding parts. In addition to the small friction noise itself, the outward propagation path of friction noise is also closed, which further reduces noise. Fourthly, the thickness of friction disk 30 can be appropriately increased, which can not only improve the overall structural strength of the friction disk 30 and facilitate processing, but also easily ensure the perpendicularity of the middle hole and the friction surface, and increase the matching length between the friction disk 30 and the shaft sleeve 70 or the braked shaft, so as to reduce the shake, noise and drag torque during rotation.

Fourthly, compared with the friction disk of the traditional brake, the friction disk 30 in this embodiment has smaller radius and greater thickness, lower manufacturing difficulty and cost, and good stability during operation. At the same speed, the friction disk with smaller radius has lower linear friction speed, less wear and long service life. The friction disk with smaller radius has smaller linear speed of its outer ring and small moment of inertia, which can reduce the throwing out of dust. Since the friction disk 30 is located inside the magnetic yoke iron core 10, the thrown dust is also left inside the magnetic yoke iron core 10, which is conducive to the cleanliness of the working environment of the brake. In particular, the dust is left inside the magnetic yoke iron core 10, which can prevent the dust from entering the air gap between the magnetic yoke iron core 10 and the armature 50. If entering the air gap, the dust will affect the axial movement of armature 50, thereby affecting the normal operation of the brake.

Fifthly, compared with the traditional brake, in the brake provided by this embodiment, the armature 50 does not contact and rub with the friction disk 30, which produces at least two advantages. Firstly, the accuracy requirements of the armature 50 are reduced, thereby reducing the manufacturing cost of the armature 50. Secondly, the armature 50 will not produce high temperature and deformation due to friction, and its magnetic properties are stable. The armature in the traditional brake would produce high temperature and deformation due to friction, which would affect the magnetic properties and deteriorate the magnetic properties. In the brake provided by this embodiment, instead of the armature and tail plate, the parts that rub with the friction disk 30 are the movable plate 20 and the structure that can clamp the friction disk 30 in cooperation with the movable plate 20. The structure and the movable plate 20 need not to be made of soft magnetic materials, and the materials can be selected in a wider range during design, with low design difficulty and cost. Moreover, the movable plate 20 does not need to be used as a magnetic circuit to generate a magnetic field. Therefore, high temperature and a small amount of deformation do not affect the normal operation of the movable plate 20, which improves the reliability of the brake. In addition, the movable plate 20 and the friction disk 30 have the small radius and appropriate thickness. Therefore, the movable plate 20 has the same advantages as the friction disk 30 in the above fourth aspect.

The Second Embodiment

Figure 2:
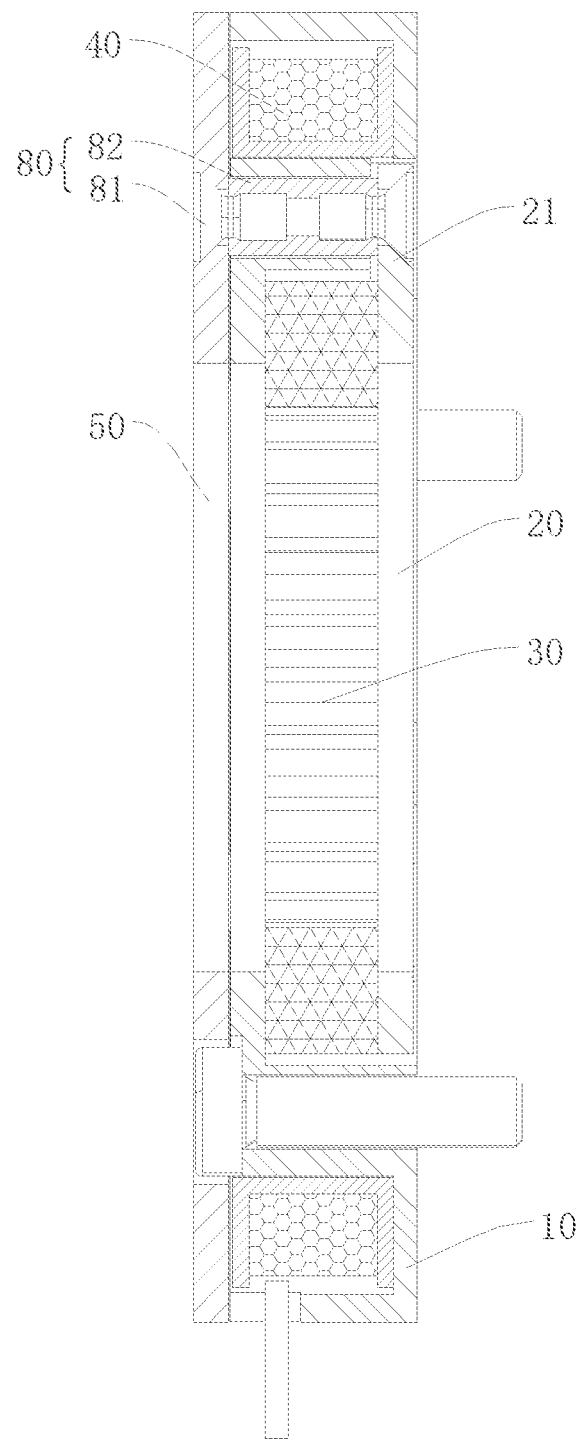
FIG. 2 is a schematic sectional structural diagram along line A-A of FIG. 1.
Figure 5:
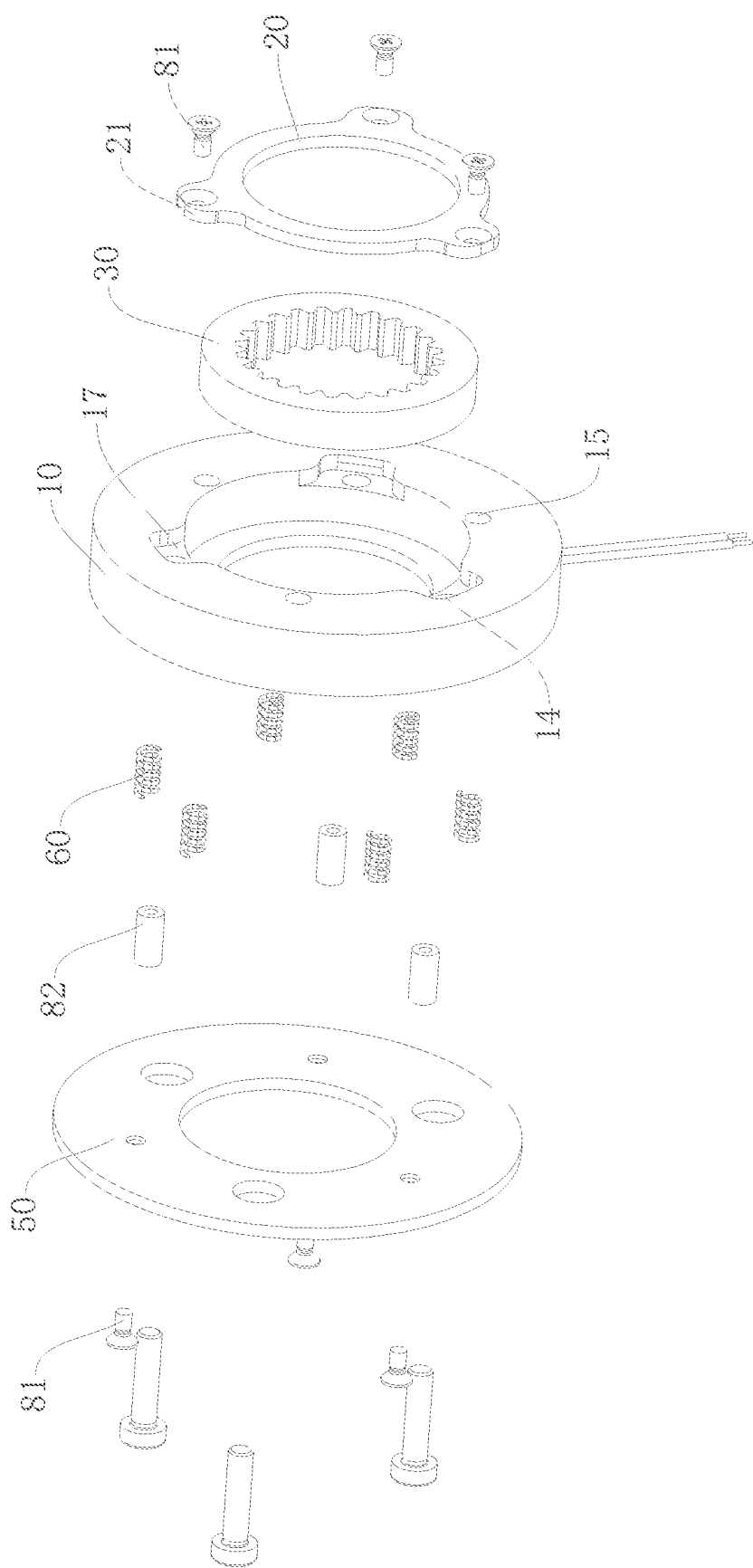
FIG. 5 is a schematic explosive structural diagram 2 of the brake provided by one embodiment of the present application.
Figure 6:
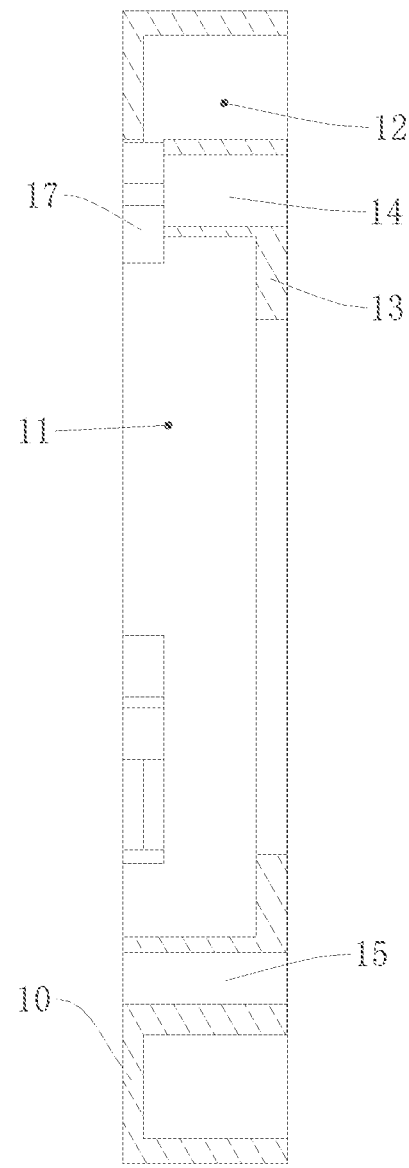
FIG. 6 is a schematic sectional structural diagram of the magnetic yoke iron core adopted by the brake provided by one embodiment of the present application.
Figure 7:
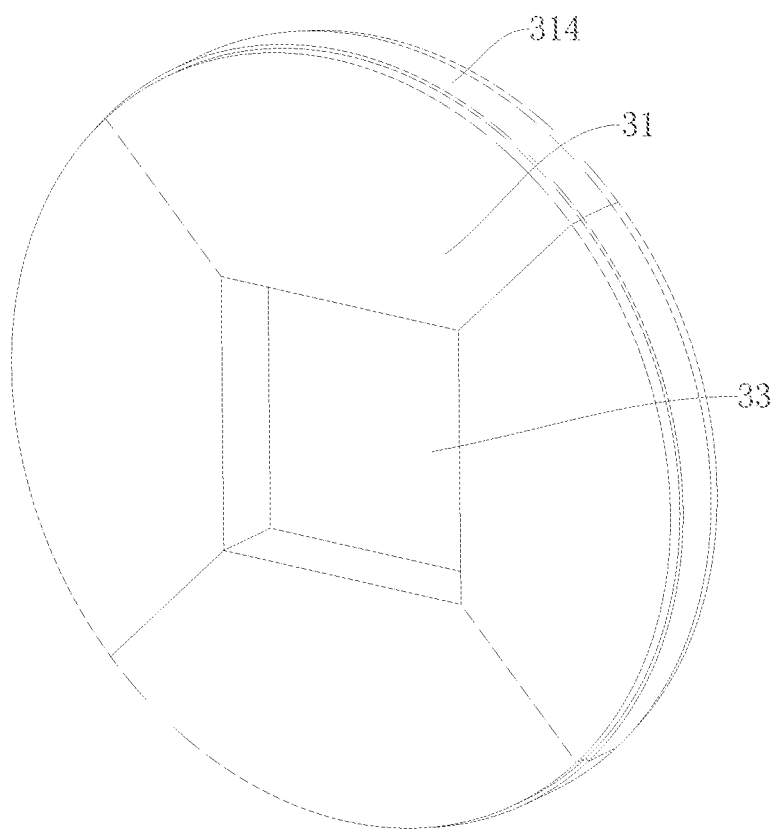
FIG. 7 is a schematic three-dimensional structural diagram of the friction disk adopted by the brake provided by one embodiment of the present application.

Based on the first embodiment, further improvements have been made to how the movable plate 20 is connected with the armature 50 in this embodiment. In this embodiment, as shown in FIG. 2, FIG. 5 and FIG. 6, the end surface of the first shaft end of the magnetic yoke iron core 10 is formed with a positioning slot 17, and the positioning slot 17 is connected with the first mounting space 11, and the connector 80 passes through the positioning slot 17. The outer circumference of the movable plate 20 is provided with a locating block 21 (radial extension part) corresponding to the positioning slot 17 (avoidance slot). The positioning slot 17 is used to avoid the locating block 21 in the spatial relationship, and the connector 80 is connected with the locating block 21. One end of the connector 80 is connected with the armature 50 and the other end is connected with the locating block 21.

When the movable plate 20 is installed, the locating block 21 is in the positioning slot 17, which can play a role of limiting effect and facilitating installation. The limiting effect means that the cooperation between the locating block 21 and the positioning slot 17 has a limiting effect. When installing the movable plate 20, the operator does not need to spend attention, experience and professional knowledge, and can directly complete the correct operation without error, so as to facilitate the installation of the movable plate 20.

The first embodiment defines that the movable plate 20 is located in the first mounting space 11. No matter how the movable plate 20 moves axially, it is always located in the first mounting space 11 inside the magnetic yoke iron core 10. Which requires that the depth of the positioning slot 17 (that is, the dimension of the positioning slot 17 from the side of the magnetic yoke iron core 10 deep into the inside of the magnetic yoke iron core 10 along the axial direction) provided by this embodiment is greater than the thickness of the locating block 21. The depth of the positioning slot 17 is determined by the axial moving distance of the movable plate 20. The axial moving distance of the movable plate 20=the length of the guide pole 82–the thickness of the friction disk 30–the thickness of the extending portion 13. The connector 80 includes two connecting pails 81 and a guide pole 82 between the two connecting pails 81. The depth of the positioning slot 17≥the axial moving distance of the movable plate 20+the thickness of the movable plate 20. The depth of the positioning slot 17 discussed above is provided that the movable plate 20 is always located in the first mounting space 11, that is, even if the movable plate 20 moves axially, it will not protrude from the surface of the magnetic yoke iron core 10. It should be noted that in some cases, the installation space of the brake is relatively loose, and the movable plate 20 can protrude from the surface of the magnetic yoke iron core 10, that is, even if the movable plate 20 protrudes from the surface of the magnetic yoke iron core 10, it will not interfere with other pails. At this time, the depth of the positioning slot 17 can be appropriately reduced or even zero.

As an example of this embodiment, as shown in FIG. 5, there may be a plurality of positioning slots 17, that is, the number of the positioning slots 17 may be three or more. The plurality of positioning slots 17 are evenly distributed around the axis of the magnetic yoke iron core 10 (i.e. the center line passing through the magnetic yoke iron core 10 along the thickness direction). The number of the positioning slots 17 is consistent with the number of the locating blocks 21 on the movable plate 20. That is, a plurality of positioning slots 17 means that there are also multiple locating blocks 21. The plurality of locating blocks 21 are connected with the armature 50 through the connector 80, which is conducive to more uniform transmission of the driving force generated by the armature 50 to the movable plate 20, so as to ensure that the movable plate 20 can better compact the friction disk 30 and produce better braking effect.

Figure 4:
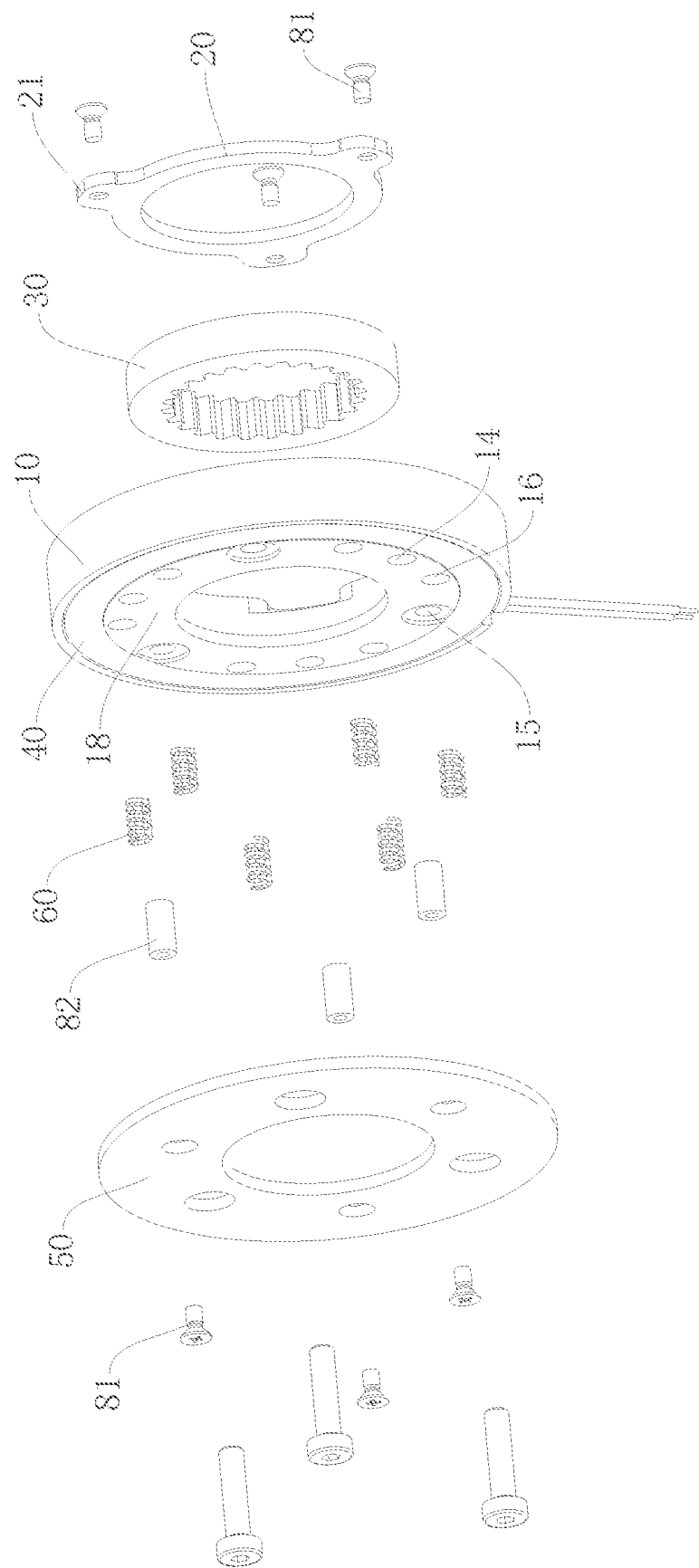
FIG. 4 is a schematic explosive structural diagram 1 of the brake provided by one embodiment of the present application.
Figure 16:
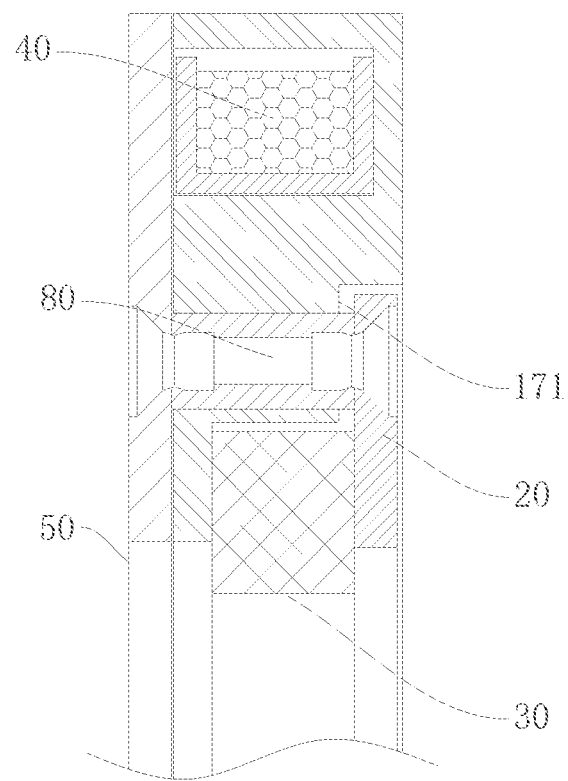
FIG. 16 is a schematic partial sectional structural diagram of the brake provided by one embodiment of the present application.

It should be noted that since the positioning slot 17 removes part of the magnetic material, if the positioning slot 17 is close to the second mounting space 12 and the coil 40, as shown in FIG. 5 and FIG. 6, negative effects on the magnetic circuit may occur. In this case, the number and depth of positioning slots 17 should not be too large. While in some other cases, the negative effect of the positioning slot 17 on the magnetic circuit is very small. For example, the positioning slot 17 is far away from the second mounting space 12 and the coil 40, or the depth of the positioning slot 17 is small. When the radial width of the annular mounting area 18 in FIG. 4 is large, the positioning slot 17 can be set close to the center of the mounting area 18. At this time, the positioning slot 17 can be far away from the second mounting space 12 and the coil 40. If the positioning slot 17 has little influence on the magnetic circuit, the positioning slot 17 may be other structures. For example, the positioning slot 17 may no longer be an independent and separate groove shown in FIG. 5 and FIG. 6, but an annular groove 171 shown in FIG. 16 around the middle of the magnetic yoke iron core 10 and coaxial with the magnetic yoke iron core 10. In the case shown in FIG. 16, it is not necessary to set a locating block 21 on the periphery of the movable plate 20. The movable plate 20 is a circular or polygonal ring plate. The connector 80 passes through the movable plate 20 itself (instead of a locating block 21 arranged on the periphery). In short, the structural form of the positioning slot 17 may be flexibly designed according to its application environment.

The Third Embodiment

Based on the first embodiment, further improvements have been made to the connector 80 in this embodiment. Each of the at least one connector 80 includes a guide pole 82 and two connecting parts 81 as shown in FIG. 2-FIG. 5. The guide pole 82 is penetrated into the magnetic yoke iron core 10, and one end of the guide pole 82 is connected to the movable plate 20 through one of the two connecting parts 81; the other end of the guide pole 82 is connected to the armature 50 through the other one of the two connecting parts 81. The guide pole 82 is slidably matched with the magnetic yoke iron core 10, and the two connecting parts 81 are fixedly connected with the movable plate 20 and the armature 50 respectively. When the armature 50 drives the movable plate 20 to move back and forth along the axial direction of the magnetic yoke iron core 10, the action is stable and smooth, and the braking effect is good.

Generally, the axis of the guide pole 82 is parallel to the axis of the magnetic yoke iron core 10. The guide pole 82 is fixedly connected with the movable plate 20 and the armature 50 through the two connecting parts 81 respectively. There are no restrictions on the implementation of the connecting part 81, such as bolts, screws, pins, rivets, etc. Whether the two connecting parts 81 are implemented in the same way is not limited; that is, the two connecting parts 81 may adopt the same implementation method or different implementation methods.

The guide pole 82 may also be fixedly connected with the movable plate 20 and the armature 50 by welding or integral molding. For example, when the integral molding method is adopted, the guide pole 82 may be integrated with the movable plate 20; that is, one end of the guide pole 82 is fixedly connected with the movable plate 20 by integral molding, and the other end of the guide pole 82 is fixedly connected with the armature 50 by other methods except integral molding. In conclusion, the present application is not limited to the fixed connection mode between the guide pole 82 and the movable plate 20 or between the guide pole 82 and the armature 50. All known fixed connection modes without creative work are within the protection scope of this application.

The Fourth Embodiment

Based on the first embodiment, further improvements have been made to the magnetic yoke iron core 10 in this embodiment. In this embodiment, an annular mounting area 18 for installing the connector 80 is formed on the magnetic yoke iron core 10 as shown in FIG. 1-FIG. 5. The mounting area 18 is located between the first mounting space 11 and the second mounting space 12, that is, along the radial direction, the first mounting space 11 is located on the innermost side, the second mounting space 12 is located on the outermost side, and the mounting area 18 is located between them. The mounting area 18 is also provided with at least one mounting hole 15, which is arranged alternately with the at least one connector 80. When installing the brake, the user may insert a bolt into the mounting hole 15 and install the brake to an external object through the bolt to realize the installation. The at least one mounting hole 15 and the at least one connector 80 are arranged alternately, which can ensure the firm installation of the brake, so as to have good stability when in use.

When the bake is mounting to an external object, the end surface of the first shaft end may be used as the mounting flange face. The brake may be fixed to an external object by connecting parts such as bolts, pins and rivets threaded into the mounting hole 15. At this time, the end surface of the first shaft end is close to the external object. In addition, the second shaft end may be used to install the brake. When the brake is installed with the second shaft end, a convex stand needs to be set at the second shaft end to leave axial movement space for the armature 50. The convex stand may be arranged on the magnetic yoke iron core 10 and protrude to the outside of the magnetic yoke iron core 10 along the thickness direction of the magnetic yoke iron core 10. The projection height of the convex stand is greater than the sum of the thickness of the armature 50 and the axial moving distance of the armature 50. The boss may be an integral structure with the magnetic yoke iron core 10 or a split structure. The convex stand may be a separate part and may be arranged on an external object. The convex stand may be an integral structure with the external object or a split structure with the external object.

In this embodiment, the connector 80 is located in the connecting hole 14. The at least one mounting hole 15 and the at least one connector 80 are arranged alternately, that is, the at least one mounting hole 15 and the at least one connecting hole 14 are arranged alternately. As an alternative embodiment, the at least one mounting hole 15 may not be arranged alternately with the at least one connecting hole 14, but the alternating arrangement in this embodiment is more conducive to the stability of the brake during operation.

In other embodiments, the mounting hole 15 may not be in the mounting area 18. For example, the mounting hole 15 may be located in the outer ring of the magnetic yoke iron core 10. Alternatively, a portion extending outward in the radial direction may be arranged on the edge of the magnetic yoke iron core 10, and the mounting hole 15 may be arranged on the portion extending outward. The position of mounting hole 15 is related to factors such as the installation environment of the brake. The technical scheme of modifying the position of the mounting hole 15 and the structure according to the installation environment and other factors is within the protection scope of this application.

Figure 3:
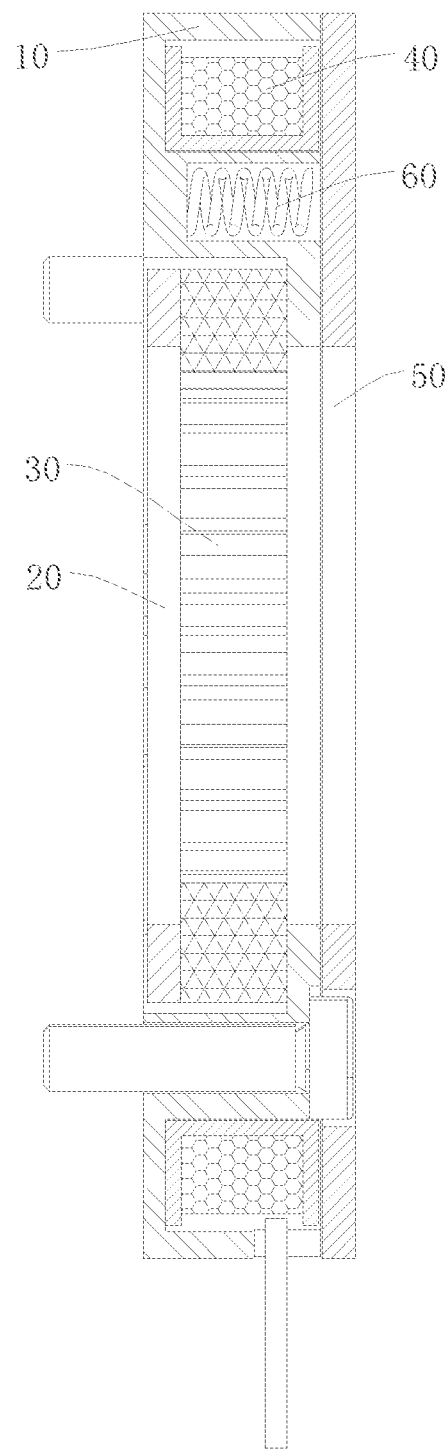
FIG. 3 is a schematic sectional structural diagram along line B-B of FIG. 1.

As an example of this embodiment, as shown in FIG. 3 and FIG. 4, the mounting area 18 is also provided with at least one blind hole 16 with opening towards the second shaft end. The at least one elastic part 60 is correspondingly installed in the at least one blind hole 16. On the annular path where the connecting holes 14 are distributed, blind holes 16 are arranged on both sides of each connecting hole 14. When the coil 40 is powered off, the armature 50 drives the movable plate 20 to squeeze the friction disk 30 under the action of the elastic part 60. If the blind hole 16 is not provided, the spring (i.e. the elastic part 60, hereinafter referred to as the spring) may be directly arranged between the armature 50 and the magnetic yoke iron core 10. However, in this case, the spring cannot be guided, and the selection specification of the spring will be limited. In this embodiment, when the blind hole 16 is set and the spring is in the blind hole 16, the inner wall of the blind hole 16 can play a certain guiding role when the spring expands and contracts, and the spring may choose a longer specification and have a longer service life.

For example, as shown in FIG. 4, there is a connecting hole 14 between each two mounting holes 15, and there is a blind hole 16 on both sides of the connecting hole 14, and the blind holes 16 on both sides of the connecting hole 14 are also between the two mounting holes 15. The distribution of the mounting holes 15, the connecting holes 14 and the blind holes 16 may also adopt other forms. The distribution form of the hole structure in the mounting area 18 may be flexibly designed according to the application environment.

The Fifth Embodiment

Based on the first embodiment, in this embodiment, the side of the first mounting space 11 close to the second shaft end has an extending portion 13 as shown in FIG. 1-FIG. 6. The extending portion 13 extends from the inner wall to the center of the magnetic yoke iron core 10. In general, the extending portion 13 is in the shape of an annular plate, and the inner diameter of the extending portion 13 is less than the outer diameter of the friction disk 30. After the brake is assembled, the extending portion 13 and the movable plate 20 are located at both ends (i.e., both sides) of the friction disk 30 respectively. When the coil 40 is powered off, the armature 50 drives the movable plate 20 close to the friction disk 30, and the two shaft end surfaces (i.e. the surfaces on both sides) of the friction disk 30 are compacted and rubbed with the movable plate 20 and the extending portion 13 respectively to realize braking. When the movable plate 20 compacts the friction disk 30, the extending portion 13 acts to prevent the axial movement of the friction disk 30. Therefore, the extending portion 13 may also be referred to as an axial resistance part.

A structure clamping the friction disk 30 in cooperation with the movable plate 20 is mentioned in the first embodiment, but the specific implementation of the structure is not limited. The extending portion 13 is a specific implementation of the structure in this embodiment. The extending portion 13 may be integrally formed with the magnetic yoke iron core 10, or may be an independent part fixedly mounted to the magnetic yoke iron core 10. When the extending portion 13 is machined integrally with the magnetic yoke iron core 10, the extending portion 13 has a high forming accuracy. The fitting accuracy between the extending portion 13 and the friction disk 30 is high and the friction effect is good.

As described in the first embodiment, the armature 50 of the brake provided in the present application does not contact and rub with the friction disk 30. Therefore, the brake provided in the present application has advantages over the traditional brake. It is emphasized here again that in the traditional brake, as shown in FIG. 15, the armature 94 contacts and rubs with the friction disk 96. The armature 94 is made of soft magnetic material. The high temperature and deformation caused by friction would affect the shape and magnetism of the armature 94. After the shape of the armature 94 is changed, it would not rub well with the friction disk 96, thereby adversely affecting the braking. After the magnetism of the armature 94 is changed, it would not be able to be effectively attracted when the coil is energized, which will adversely affect the separation of the armature 94 and the friction disk 96. In the brake provided by this embodiment, the movable plate 20 and the extending portion 13 are used to replace some functions of the armature 94 and the tail plate 95 of the traditional brake (functions in terms of friction braking). Compared with the armature 94 and the tail plate 95, the movable plate 20 and the extending portion 13 are easier to design and process, and have higher stability during operation.

The Sixth Embodiment

Based on any one of the first to the fifth embodiments, further improvements have been made to the friction disk 30 in this embodiment. In traditional friction disk, only the planes on both sides can participate in friction as working surfaces. In contrast, the circumferential surface of the friction disk 30 provided by the embodiment may also participate in friction as a working surface.

In this embodiment, each the friction disk 30 includes an elastic component 32 and a plurality of friction monomers 31 as shown in FIG. 7-FIG. 14. The plurality of friction monomers 31 are distributed in an annular array around the axis of the magnetic yoke iron core 10 and enclosed to form a central space 33. Each the friction monomer 31 has a freedom to approach or move away from the central space 33 along a radial direction of the magnetic yoke iron core 10, and the elastic component 32 is respectively connected with the plurality of friction monomers 31; the elastic component 32 is configured with a pre-tightening force to make each the friction monomer 31 close to the central space 33.

It should be noted that the elastic component 32 is respectively connected with a plurality of friction monomers 31, which means that the elastic component 32 includes a plurality of elastic parts, and the plurality of elastic parts are respectively connected with the friction monomers 31. The friction monomer 31 may also be referred to as a unit block. Generally, the friction disk 30 is in a round cake shape and has a certain thickness. The axis of the magnetic yoke iron core 10 is the center line passing through the magnetic yoke iron core 10 along the thickness direction.

In the initial state, each friction monomer 31 is close to each other. When the rotational speed of the friction disk 30 exceeds the preset value (within or beyond the allowable rotational speed), the centrifugal force generated by the friction monomer 31 overcomes the pre-tightening force of the elastic component 32, and the friction monomer 31 moves away from the central space 33 along the radial direction of the magnetic yoke iron core 10. At this time, the two adjacent friction monomers 31 will be separated from each other to produce a gap, the overall outer diameter of the friction disk 30 increases, and the outer arc surface of the friction monomer 31 contacts the inner wall of the first mounting space 11 to produce friction and braking.

The traditional friction disk is an integrated structure. The friction disk provided in this embodiment is a split structure, that is, the friction disk 30 is composed of a plurality of friction monomers 31. The plurality of friction monomers 31 are separated from each other at a certain speed for the friction disk 30 provided by this embodiment by using the split structure, so as to increase the overall outer diameter of the friction disk 30 and the outer arc surface of the friction monomer 31 can participate in friction as a working surface. The friction can provide additional braking force when the friction disk 30 (and the braked shaft) rotates at high speed, which enhances the reliability of the brake. The above additional braking force can not only increase the original braking force (i.e. the braking force generated by plane friction on both sides), but also replace the original braking force to realize braking in case of brake failure and failure to generate the original braking force.

It should be noted that the displacement of each friction monomer 31 is the same and the outer arc surface of each friction monomer 31 is located on the same cylindrical surface in the process of away from the central space 33 and separation. The cylindrical surface is coaxial with the friction disk 30, and the radius of the cylindrical surface changes with the movement of the friction monomer 31.

The Seventh Embodiment

Figure 8:
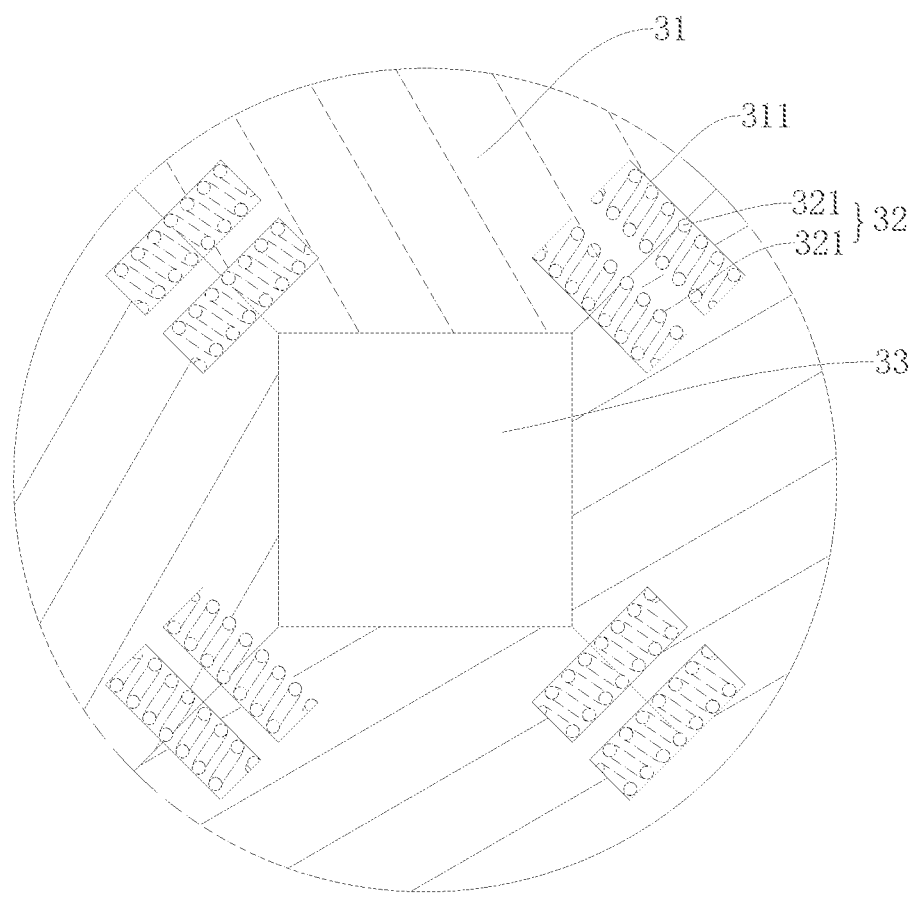
FIG. 8 is a schematic sectional structural diagram of the friction disk adopted by the brake provided by one embodiment of the present application.
Figure 10:
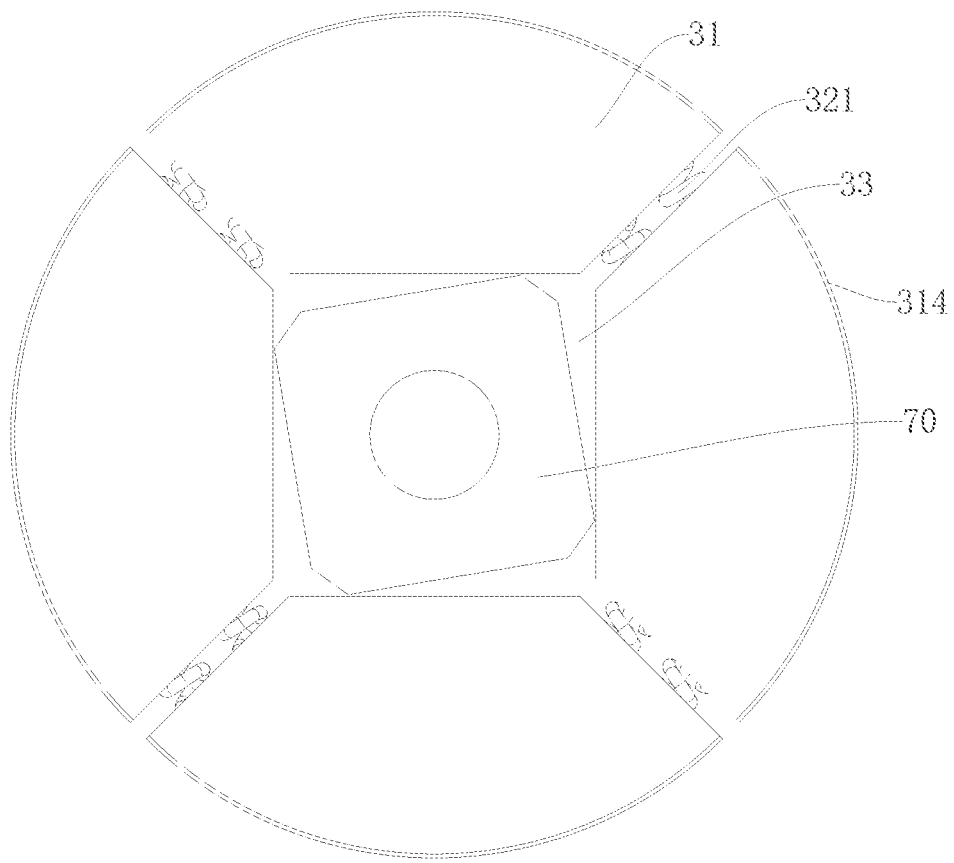
FIG. 10 is a schematic use state diagram of the friction disk adopted by the brake provided by one embodiment of the present application.
Figure 11:
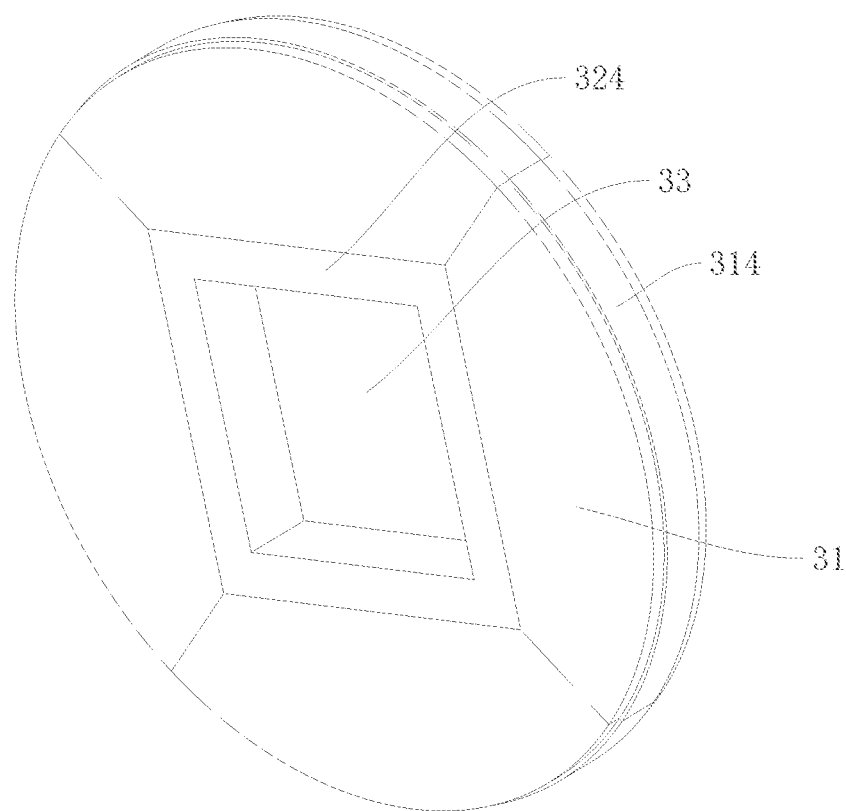
FIG. 11 is a schematic three-dimensional diagram of the friction disk adopted by the brake provided by another one embodiment of the present application.

Based on the sixth embodiment, further improvements have been made to the elastic component 32 in this embodiment. In this embodiment, the elastic component 32 includes a plurality of first tension spring groups as shown in FIG. 8 and FIG. 10, and each of the first tension spring groups is connected between two adjacent friction monomers 31. Each of the first tension spring group includes at least one first tension spring 321. The central space 33 forms a space for adapting a shaft sleeve. Each first tension spring 321 is fixed between two adjacent friction monomers 31. The number of the first tension springs 321 included in each first tension spring group is unlimited. For example, two adjacent friction monomers 31 may be connected through one first tension spring 321 or two first tension springs 321 (that is, one first tension spring group includes two first tension springs 321). The number of the first tension springs 321 needs to take into account the strength of the structure and the corresponding speed when the friction monomer 31 is separated. The first tension spring 321 is used to connect the adjacent friction monomers 31, so that all the friction monomers 31 form a friction disk 30 as a whole in this embodiment. The overall structure of the friction disk 30 is simple and easy to assemble.

It can be understood that the first tension spring 321 may not protrude from the two end faces of the friction monomer 31 along the axial direction of the magnetic yoke iron core 10, otherwise it will affect the two shaft end surfaces (two side surfaces) of the friction disk 30 to participate in friction as the working surface.

In this embodiment, the two ends of each first tension spring 321 are respectively connected with two adjacent friction monomers 31. The stress analysis of a single friction monomer 31 is carried out, and its two sides are pulled by the first tension spring 321 respectively. The pulling force has two components, one is the radial force pointing to the circle center, and the other is the circumferential force perpendicular to the radial force. For the first tension springs 321 on different sides of the friction monomer 31, their circumferential forces are equal and opposite to each other, offsetting each other. Their radial forces are in the same direction, pointing to the circle center along the radial direction, forming a resultant force to move the friction monomer 31 to the central space 33.

Figure 9:
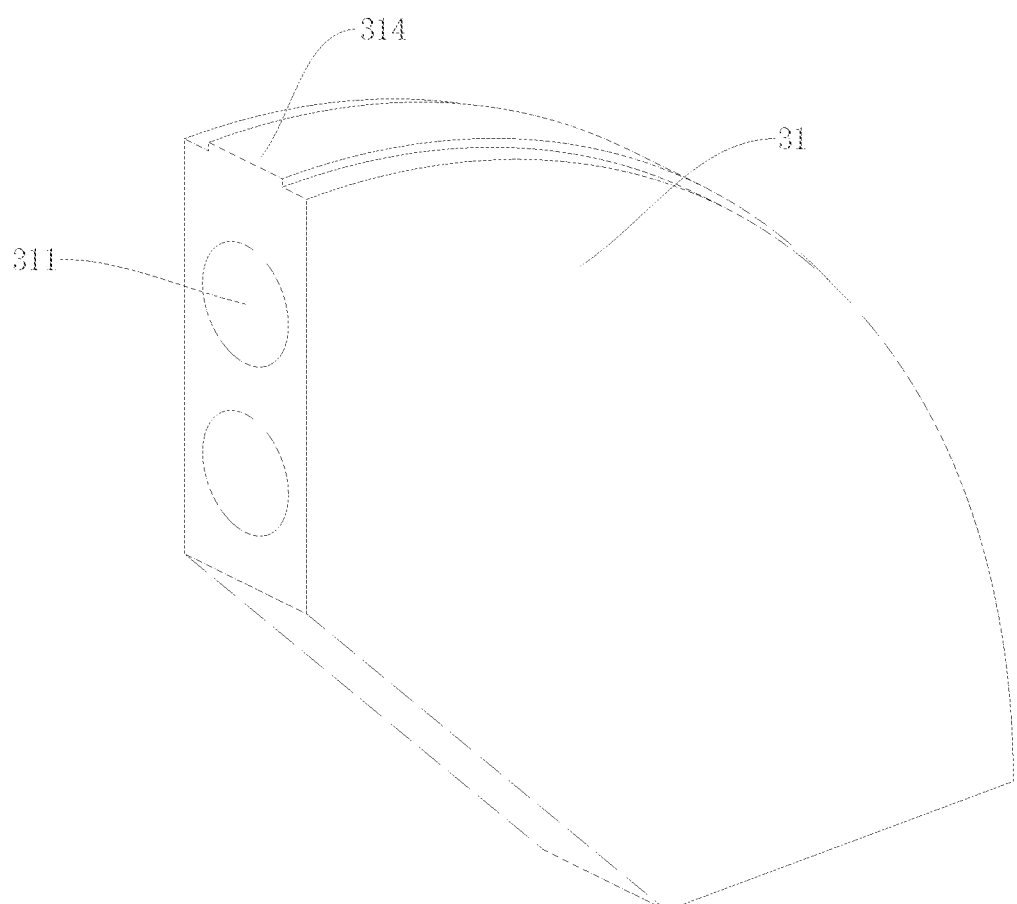
FIG. 9 is a schematic three-dimensional structural diagram of the friction monomer adopted by the brake provided by one embodiment of the present application.

As an example of this embodiment, the corresponding surface of the friction monomer 31 is provided with a first accommodating groove 311 as shown in FIG. 8 and FIG. 9. The corresponding surface is the side of one friction monomer 31 adjacent to the other friction monomer 31, and each friction monomer 31 has two corresponding surfaces. Both ends of each first tension spring 321 are respectively fixedly connected to the two adjacent friction monomers 31, specifically, they are respectively fixed to the groove bottom of the two first accommodating groove 311 whose opening is opposite.

If the first accommodating groove 311 is not set, the first tension spring 321 is between two adjacent friction monomers 31. Even the speed does not exceed the preset value, there is a certain gap between the adjacent friction monomers 31 due to the first tension spring 321. Which is not conducive to the overall stability of friction disk 30. Moreover, in this case, the length of the first tension spring 321 is also greatly limited and may not be too long. With the first accommodating groove 311 set, the first tension spring 321 is in the first accommodating groove 311 when the speed does not exceed the preset value. The adjacent friction monomers 31 may be close to each other through the side, which is conducive to improving the overall stability of the friction disk 30. Moreover, the first tension spring 321 may also choose a longer specification to optimize the effect of applying tension to the friction monomer 31.

The Eighth Embodiment

Based on the sixth embodiment, further improvements have been made to the central space 33 in this embodiment. In this embodiment, the section of the central space 33 is polygonal as shown in FIG. 7-FIG. 10. When the central space 33 (i.e. the shaft sleeve fitting space, a space for adapting a shaft sleeve) surrounded by the friction monomer 31 is polygonal, the shape of the shaft sleeve 70 may easily fit the central space 33.

When the rotational speed is low, the inner wall of the central space 33 fits with the peripheral side wall of the shaft sleeve 70 (That is, the inner surface of each friction monomer 31 fits with the outer peripheral wall of the shaft sleeve 70). While when the rotational speed is too high, the adjacent friction monomers 31 are separated, so that the central space 33 becomes larger and larger than the outer diameter of the shaft sleeve 70. At this time, the friction monomer 31 is separated from the drive of the shaft sleeve 70, and the rotational speed of the friction disk 30 will be correspondingly reduced compared with the shaft sleeve 70. That is, the shaft sleeve 70 rotates faster, while the speed of the friction disk 30 is slower, and there is a speed difference between the shaft sleeve 70 and the friction disk 30. The speed difference will continue to increase until each edge of the shaft sleeve 70 is correspondingly clamped on each surface of the central space 33 (from a two-dimensional perspective, that is, each vertex of the shaft sleeve 70 is clamped on each edge of the section polygon of the central space 33), and the shaft sleeve 70 is stably clamped with the friction monomer 31 again. At this time, the shaft sleeve 70 can transmit the driving force to the friction monomer 31, so that the friction disk 30 maintains a certain speed, and the friction monomer 31 maintains a state of separation from each other. In this state, the outer arc surface of the friction monomer 31 contacts the inner wall of the first mounting space 11 (i.e. the inner peripheral surface of the magnetic yoke iron core 10), resulting in friction and braking. In some special cases, the shaft sleeve 70 may be clamped with each friction monomer 31 after the speed is reduced, so that the friction monomer 31 cannot be pulled back by the first tension spring 321. At this time, in order to restore the friction monomer 31 to the normal state, the shaft sleeve 70 can be rotated reversely so that the shaft sleeve 70 is no longer clamped with the friction monomer 31, and the friction monomer 31 can be pulled back by the first tension spring 321.

For example, one side of the friction monomer 31 close to the central space 33 is a plane, and the side is the surface on which the friction monomer 31 fits with the peripheral side wall of the shaft sleeve 70. The number of friction monomers 31 is greater than or equal to three, and the number of the friction monomers 31 is equal to the number of sides of the section polygon of the central space 33. For example, when the number of friction monomers 31 is four, the section of the central space 33 is quadrilateral.

It should be noted that the section of the central space 33 may be circular in other embodiments. When the section of the central space 33 is circular, the shaft sleeve 70 and the friction disk 30 may be matched and connected through a toothed structure. The shaft sleeve 70 and the friction disk 30 connected by the toothed structure may have a stable matching state, and there is no need to reverse the shaft sleeve 70 when the shaft sleeve 70 is clamped with the friction disk 30 and when the central space 33 is polygonal.

The Ninth Embodiment

This embodiment and the seventh embodiment are two parallel embodiments. In the seventh embodiment, the first tension spring group is used to connect each friction monomer 31 as a whole to form a friction disk 30. In this embodiment, the fixed frame 324 and the second tension spring group are used to connect each friction monomer 31 as a whole of the friction disk 30.

In this embodiment, the elastic component 32 includes a fixed frame 324 and a second tension spring group as shown in FIG. 11-FIG. 14. The fixed frame 324 is located in the central space 33 and the inside of the fixed frame 324 forms a space for adapting the shaft sleeve. The second tension spring group is connected between the plurality of friction monomers 31 and the fixed frame 324 (i.e. one end of the second tension spring group is connected with the friction monomer 31, and the other end is connected with the fixed frame 324). The second tension spring group includes at least one second tension spring 322. The fixed frame 324 fits with the shaft sleeve 70. When the rotational speed is lower than the preset value, the tensile force of the second tension spring 322 is greater than the centrifugal force received by each friction monomer 31, and one side of the friction monomer 31 close to the central space 33 is attached to the peripheral surface of the fixed frame 324. When the rotational speed is higher than the preset value, the tensile force of the second tension spring 322 is less than the centrifugal force received by each friction monomer 31 and the friction monomer 31 moves away from the central space 33 along the radial direction of the magnetic yoke iron core 10, and one side of the friction monomer 31 close to the central space 33 is separated from the outer peripheral surface of the fixed frame 324. In this way, with the change of the speed of the braked shaft, the friction monomer 31 dynamically approaches or moves away from the central space 33 along the radial direction of the magnetic yoke iron core 10. Moreover, when the friction monomer 31 moves away from the central space 33 along the radial direction of the magnetic yoke iron core 10, the outer diameter of the whole friction disk 30 becomes larger, and the outer circumference of the friction disk 30 contacts the inner wall (i.e. the inner peripheral surface of the magnetic yoke iron core 10) of the first mounting space 11 to generate friction and braking, so as to reduce the speed of the friction disk 30 and the braked shaft.

In this embodiment, the section of the fixed frame 324 may be circular or polygonal. When the section of the fixed frame 324 is circular, the number of the second tension spring group is one, the second tension spring group includes a plurality of the second tension springs 322, the plurality of the second tension springs 322 are evenly distributed around the fixed frame 324. When the section of the fixed frame 324 is polygonal, the number of the second tension spring group is a plurality, a plurality of the second tension spring groups are set one by one corresponding to one side of the fixed frame 324 away from the central space 33. The number of sections of the fixed frame 324 is the same as the number of sides. Moreover, each second tension spring group is located in the middle of the outer side corresponding to the fixed frame 324.

The Tenth Embodiment

Figure 12:
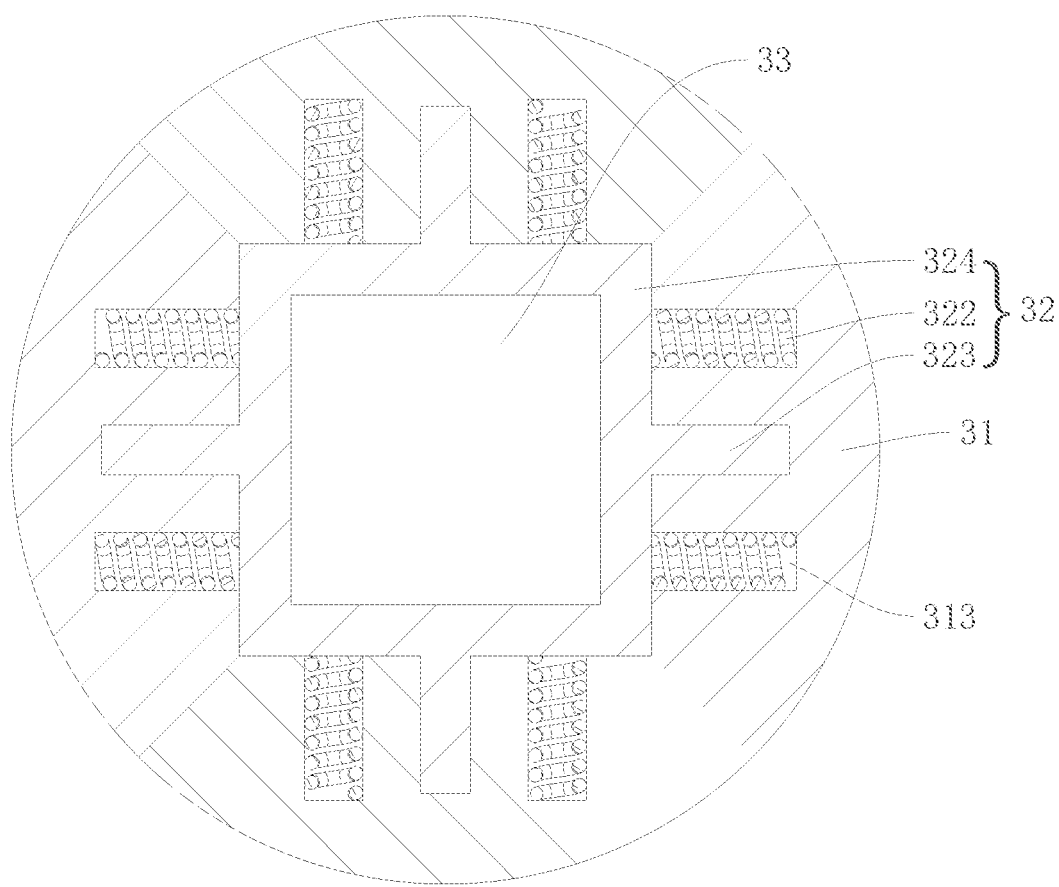
FIG. 12 is a schematic sectional structural diagram of the friction disk adopted by the brake provided by another one embodiment of the present application.
Figure 14:
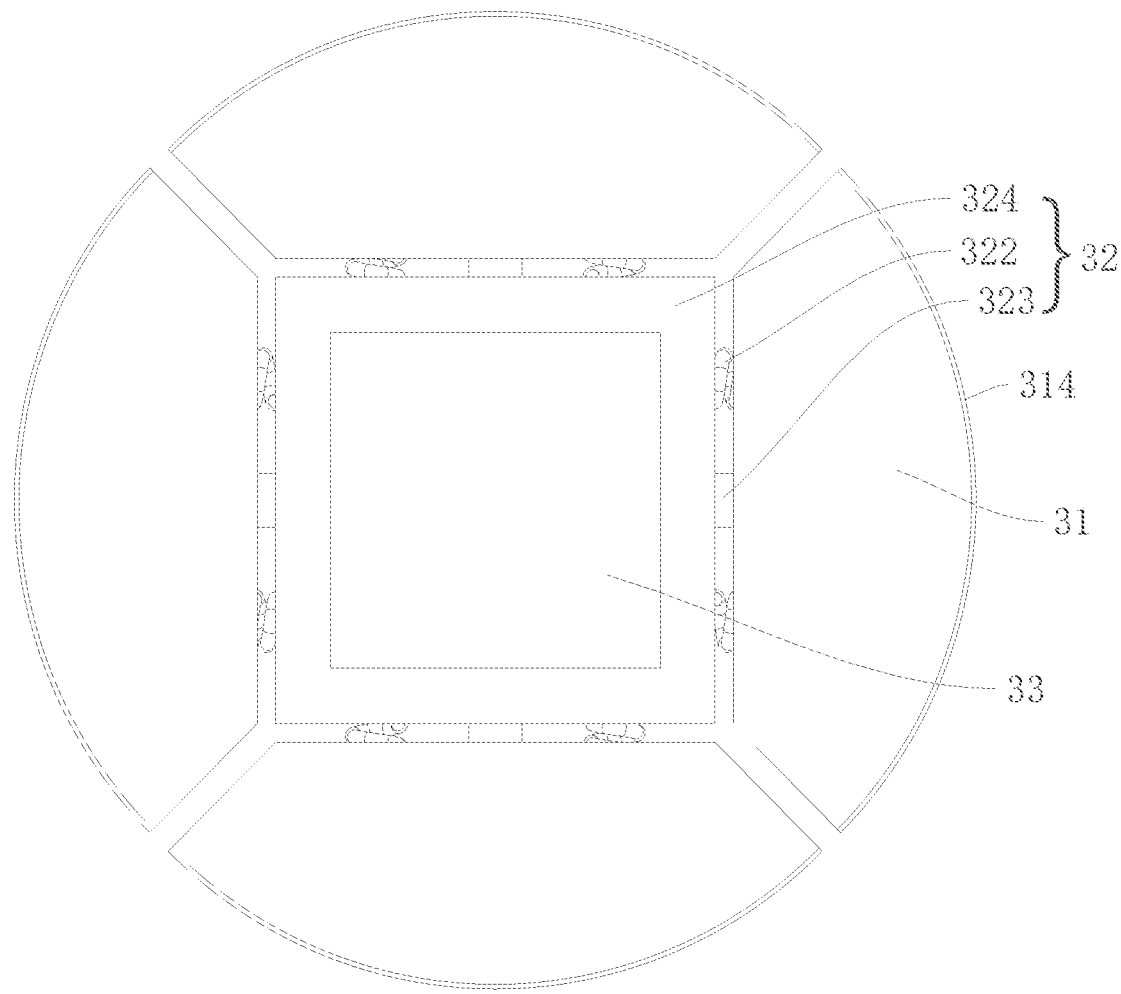
FIG. 14 is a schematic use state diagram of the friction disk adopted by the brake provided by another one embodiment of the present application.

Based on the ninth embodiment, further improvements have been made to the elastic component in this embodiment. In this embodiment, the elastic component 32 further includes at least one guide post 323 having an end fixedly connected to the fixed frame 324 as shown in FIG. 12 and FIG. 14. Each the guide post 323 extends along the radial direction of the magnetic yoke iron core 10, and a chute 312 slidably matched with the guide post 323 is arranged on one side of the friction monomer 31 close to the central space 33. The guide post 323 may guide the movement of the friction monomer 31 to ensure that the friction monomer 31 moves according to the preset path and prevent the movement path of the friction monomer 31 from skewing. This enhances the ability of the friction monomer 31 to withstand interference and ensures that the friction monomer 31 accurately corresponds to the peripheral surface of the fixed frame 324 when it is closed and reset.

For example, the guide post 323 may be a pin sliding with the chute 312. The matching form of the guide post 323 and the chute 312 provided in this embodiment has better effect when the section of the fixed frame 324 is polygonal.

As an example of this embodiment, each guide post 323 is arranged in the middle position of one side of the friction monomer 31 close to the central space 33 as shown in FIG. 12 and FIG. 14. The guide post 323 is in the middle position, which is conducive to the stability of the friction monomer 31 when moving along the radial direction of the magnetic yoke iron core 10 and optimizes the guiding effect. In this embodiment, when the second tension spring group includes a plurality of second tension springs 322, the plurality of second tension springs 322 are equidistantly distributed along the long side of the side of the friction monomer 31. When the number of the second tension springs 322 is even, the number of the second tension springs 322 on both sides of the guide post 323 is the same. When the number of the second tension springs 322 is odd, the difference in the number of the second tension springs 322 on both sides of the guide post 323 is 1; alternatively, the number of the second tension springs 322 on both sides of the guide post 323 is the same, and the second tension spring 322 in the middle is sleeved on the guide post 323. At this time, the second tension spring 322 sleeved on the guide post 323 is located in the chute 312 and shares the chute 312 with the guide post 323.

Figure 13:
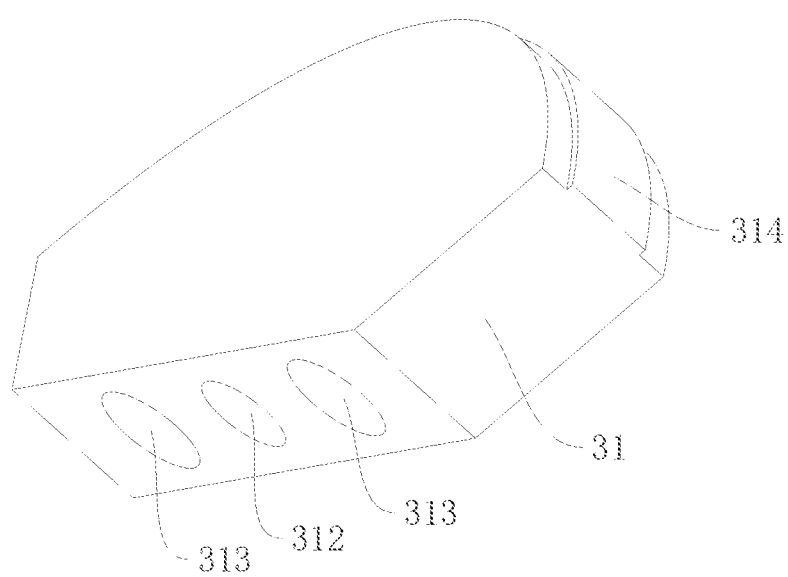
FIG. 13 is a schematic three-dimensional structural diagram of the friction monomer adopted by the brake provided by another one embodiment of the present application.

As an example of this embodiment, a second accommodating groove 313 is formed on one side of the friction monomer 31 close to the central space 33 as shown in FIG. 12 and FIG. 13. Both ends of the second tension spring 322 are respectively fixedly connected to the groove bottom of the second accommodating groove 313 and the outer peripheral surface of the fixed frame 324. When the rotational speed does not exceed the preset value, the tension of the second tension spring 322 is greater than the centrifugal force of the friction monomer 31, and the friction monomer 31 is close to the fixed frame 324. If without the second accommodating groove 313, the second tension spring 322 is between the friction monomer 31 and the fixed frame 324, and there will be a gap between the friction monomer 31 and the fixed frame 324, and the length of the second tension spring 322 may not be too long. With the second accommodating groove 313 set, the second tension spring 322 is in the second accommodating groove 313 when the speed does not exceed the preset value, which enables the friction monomer 31 to cling to the fixed frame 324 and improves the overall stability of the friction disk 30. Moreover, the second tension spring 322 may also choose a longer specification to optimize the effect of reciprocating movement of the friction monomer 31.

The Eleventh Embodiment

Based on the sixth embodiment, further improvements have been made to the friction monomer 31 in this embodiment. In this embodiment, a boss 314 is arranged on one side of each the friction monomer 31 away from the central space 33 as shown in FIG. 7-FIG. 14. The requirements for the thickness of the friction disk 30 and the flatness of the two surfaces are very high. If the boss 314 is not set, when overspeed braking occurs (that is, when the rotational speed exceeds the preset value, the friction monomer 31 is far away from the central space 33, and the outer peripheral surface of the friction disk 30 rubs with the inner wall of the magnetic yoke iron core 10), the outer edge of the friction disk 30 will be worn, which may affect the flatness of the two side surfaces of the friction disk 30, the radius and the thickness of the outer ring of the friction disk 30, and then affect the braking effect. When the friction monomer 31 moves away from the central space 33, the boss 314 on the outer circumference of the friction monomer 31 first contacts the inner wall (i.e. the inner peripheral surface of the magnetic yoke iron core 10) of the first mounting space 11 due to the boss 314 provided. In this way, the boss 314 is preferentially worn, and the flatness of the surface on both sides of the friction disk 30, the radius and the thickness of the outer ring of the friction disk 30 are not affected, so as to maintain a good braking effect.

The above-mentioned embodiments are only used to illustrate the technical solutions of the disclosure, but not to limit the disclosure. However, these modifications or replacements do not make the essence of the corresponding technical solutions deviate from the spirit and scope of the technical solutions of the embodiments of the present application, and should be included within the protection scope of the present application.

What is claimed is:
1. A brake comprising:
 a magnetic yoke iron core comprising a first mounting space and a second mounting space distributed sequentially and concentrically from inside to outside of the magnetic yoke iron core, the first mounting space penetrating through a center position of the magnetic yoke iron core in an axial direction of the magnetic yoke iron core, and an opening of the second mounting space facing a second shaft end of the magnetic yoke iron core;
 a movable plate located in the first mounting space and close to a first shaft end of the magnetic yoke iron core, the first shaft end being an opposite end of the second shaft end;

a friction disk arranged in the first mounting space and located at a side of the movable plate close to the second shaft end;
a coil arranged in the second mounting space;
an armature located at the second shaft end of the magnetic yoke iron core, the armature being connected with the movable plate through at least one connector, the at least one connector passing through the magnetic yoke iron core and being slidably matched with the magnetic yoke iron core, and the armature being configured to drive the movable plate to move along the axial direction of the magnetic yoke iron core; and
an elastic part arranged between the armature and the magnetic yoke iron core, the elastic part having a pre-tightening force that enables the armature to be far away from the magnetic yoke iron core; and
wherein an overall thickness of the brake depends on a thickness of the magnetic yoke iron core and a thickness of the armature.

2. The brake according to claim 1, further comprising at least one positioning slot formed on an end surface of the first shaft end of the magnetic yoke iron core, the at least one positioning slot being connected to the first mounting space, and the at least one connector correspondingly passing through the at least one positioning slot; and
wherein an outer circumference of the movable plate is provided with at least one locating block corresponding to the at least one positioning slot, the at least one positioning slot being configured to avoid the at least one locating block, and the at least one connector being connected to the at least one locating block.

3. The brake according to claim 2, wherein the friction disk comprises an elastic component and a plurality of friction monomers; and
the plurality of friction monomers are distributed in an annular array around an axis of the magnetic yoke iron core and enclosed to form a central space, each of the plurality of friction monomers being movable towards or away from the central space along a radial direction of the magnetic yoke iron core, the elastic component being connected with the plurality of friction monomers, respectively, and the elastic component being configured with a pre-tightening force to make the plurality of friction monomers close to the central space.

4. The brake according to claim 1, wherein each one of the at least one connector comprises a guide pole and two connecting parts; and the guide pole passes through the magnetic yoke iron core, one end of the guide pole is connected to the movable plate through one of the two connecting parts, and the other end of the guide pole is connected to the armature through the other one of the two connecting parts.

5. The brake according to claim 4, wherein the friction disk comprises an elastic component and a plurality of friction monomers; and
the plurality of friction monomers are distributed in an annular array around an axis of the magnetic yoke iron core and enclosed to form a central space, each of the plurality of friction monomers being movable towards or away from the central space along a radial direction of the magnetic yoke iron core, the elastic component being connected with the plurality of friction monomers, respectively, and the elastic component being configured with a pre-tightening force to make the plurality of friction monomers close to the central space.

6. The brake according to claim 1, further comprising an annular mounting area for mounting the at least one connector formed on the magnetic yoke iron core, the annular mounting area being between the first mounting space and the second mounting space; and
wherein the annular mounting area is provided with at least one mounting hole, and the at least one mounting hole is arranged alternately with the at least one connector.

7. The brake according to claim 6, wherein the friction disk comprises an elastic component and a plurality of friction monomers; and
the plurality of friction monomers are distributed in an annular array around an axis of the magnetic yoke iron core and enclosed to form a central space, each of the plurality of friction monomers being movable towards or away from the central space along a radial direction of the magnetic yoke iron core, the elastic component being connected with the plurality of friction monomers, respectively, and the elastic component being configured with a pre-tightening force to make the plurality of friction monomers close to the central space.

8. The brake according to claim 1, wherein an inner side surface of the first mounting space close to the second shaft end is provided with an extending portion extending towards an axis of the magnetic yoke iron core, and an inner diameter of the extending portion is less than an outer diameter of the friction disk.

9. The brake according to claim 8, wherein the friction disk comprises an elastic component and a plurality of friction monomers; and
the plurality of friction monomers are distributed in an annular array around an axis of the magnetic yoke iron core and enclosed to form a central space, each of the plurality of friction monomers being movable towards or away from the central space along a radial direction of the magnetic yoke iron core, the elastic component being connected with the plurality of friction monomers, respectively, and the elastic component being configured with a pre-tightening force to make the plurality of friction monomers close to the central space.

10. The brake according to claim 1, wherein the friction disk comprises an elastic component and a plurality of friction monomers; and
the plurality of friction monomers are distributed in an annular array around an axis of the magnetic yoke iron core and enclosed to form a central space, each of the plurality of friction monomers being movable towards or away from the central space along a radial direction of the magnetic yoke iron core, the elastic component being connected with the plurality of friction monomers, respectively, and the elastic component being configured with a pre-tightening force to make the plurality of friction monomers close to the central space.

11. The brake according to claim 10, wherein the elastic component comprises a plurality of first tension spring groups, each of the plurality of first tension spring groups being connected between two adjacent friction monomers, each of the plurality of first tension spring groups comprising at least one first tension spring, and the central space forming a space for adapting a shaft sleeve.

12. The brake according to claim 10, wherein the elastic component comprises:

a fixed frame located in the central space, the fixed frame forming a space within for adapting a shaft sleeve; and a second tension spring group connected between the plurality of friction monomers and the fixed frame, the second tension spring group comprising at least one second tension spring.

13. The brake according to claim 12, wherein the elastic component further comprises at least one guide post having an end fixedly connected to the fixed frame; and the at least one guide post extends along the radial direction of the magnetic yoke iron core, and a chute slidably matched with the at least one guide post is arranged on one side of at least one friction monomer close to the central space.

14. The brake according to claim 10, further comprising a boss arranged on one side of each of the plurality of friction monomers away from the central space.

\* \* \* \* \*